US005454300A

United States Patent [19]
Rainey et al.

[11] Patent Number: 5,454,300
[45] Date of Patent: Oct. 3, 1995

[54] APPARATUS FOR REMOVING OUTER LAYERS OF PALM STALKS FROM PALM HEART

[75] Inventors: Ronald S. Rainey, Easton; Ian P. Campbell, Rowayton, both of Conn.; Pablo M. A. Fallas, San Jose; Edgar N. Solano, Diagonal a Aldreas S.O.S., both of Costa Rica

[73] Assignee: Roberto Gonzales Barrera, Monterrey, Mexico

[21] Appl. No.: 112,970

[22] Filed: Aug. 30, 1993

[51] Int. Cl.$^6$ ..................................................... A23N 4/12
[52] U.S. Cl. .................. 99/542; 99/537; 99/544; 99/567; 99/591; 99/593
[58] Field of Search .................. 99/537–544, 567, 99/537, 568, 588, 591–593, 635–637, 623, 642, 643, 628; 426/481–484

[56] References Cited

U.S. PATENT DOCUMENTS

| | | | |
|---|---|---|---|
| 1,872,889 | 8/1932 | Champlin et al. | 99/643 |
| 3,273,618 | 9/1966 | Flodin | 99/643 |
| 4,212,237 | 7/1980 | Hsu | 99/589 |
| 4,321,865 | 3/1982 | Ramseier | 99/576 |
| 4,430,931 | 2/1984 | Hsu | 99/591 |
| 4,708,056 | 11/1987 | Dinanath | 99/568 |

*Primary Examiner*—Timothy F. Simone
*Attorney, Agent, or Firm*—William G. Rhines

[57] ABSTRACT

Apparatus and methods are disclosed for removing palm hearts from cut lengths of stalks of palm each of which includes a large "meristem" section that is joined to a smaller diameter top section by an intermediate tapered section, and has a palm heart that runs the length of the stalk as a core member inside an intermediate layer that is surrounded by a thorny outer bark layer. Each such stalk is caused to move longitudinally through bark removal means for slitting the outer bark layer of its smaller diameter section and removing the bark from the remainder of the stalk. The smaller section, after having been severed from the rest of the stalk, is caused to move longitudinally through intermediate layer removal means for slitting and removing the intermediate layer from the underlying palm heart. Embodiments include each such means per se and acting cooperatively with the other, and methods for carrying out the foregoing processes.

6 Claims, 13 Drawing Sheets

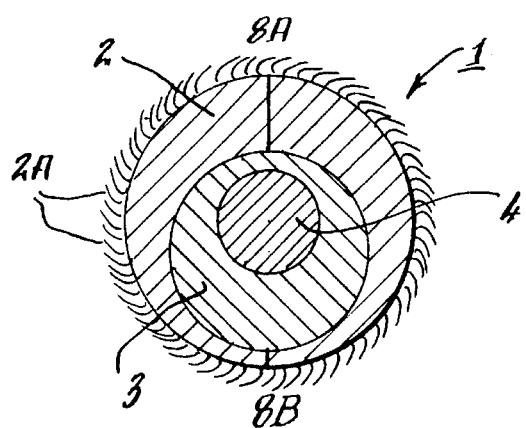
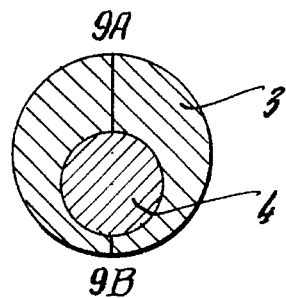
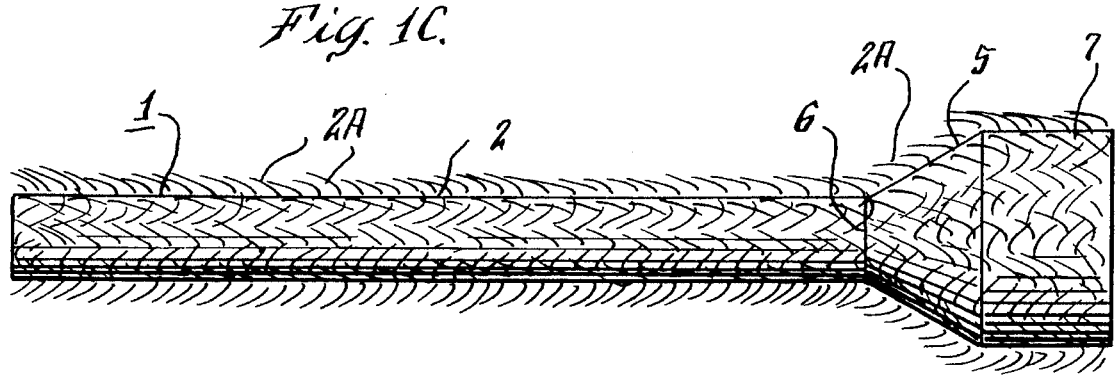

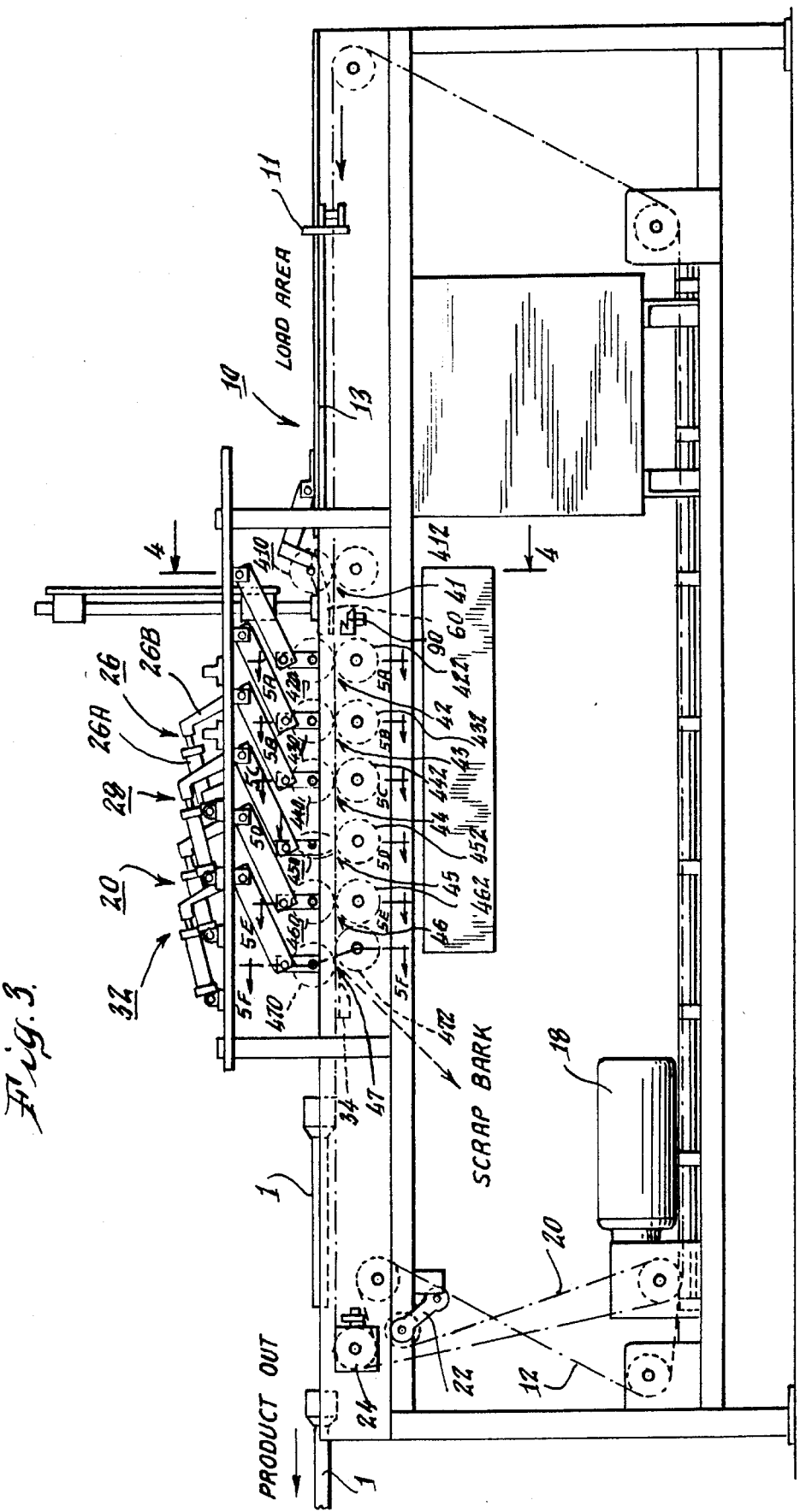

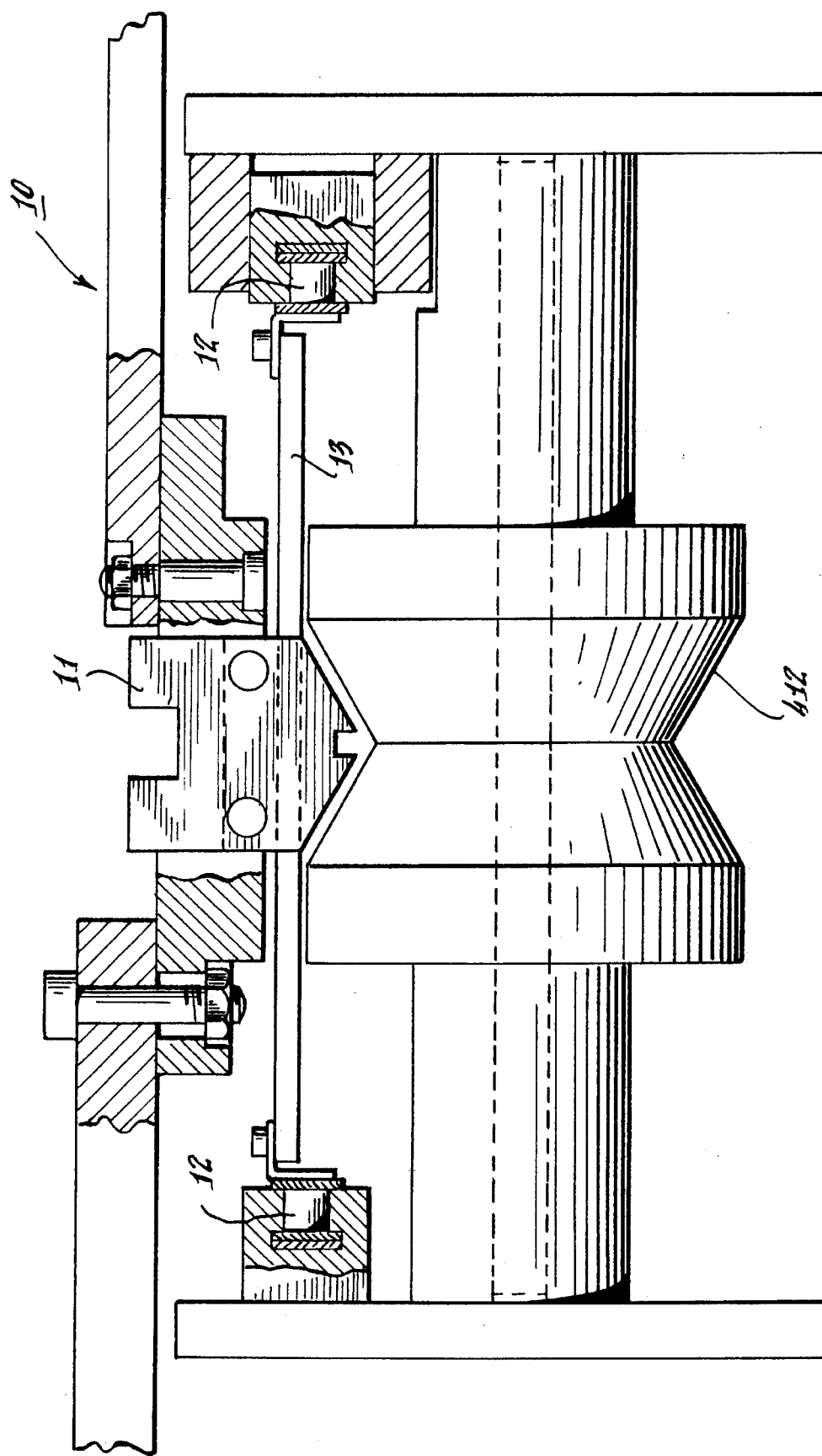

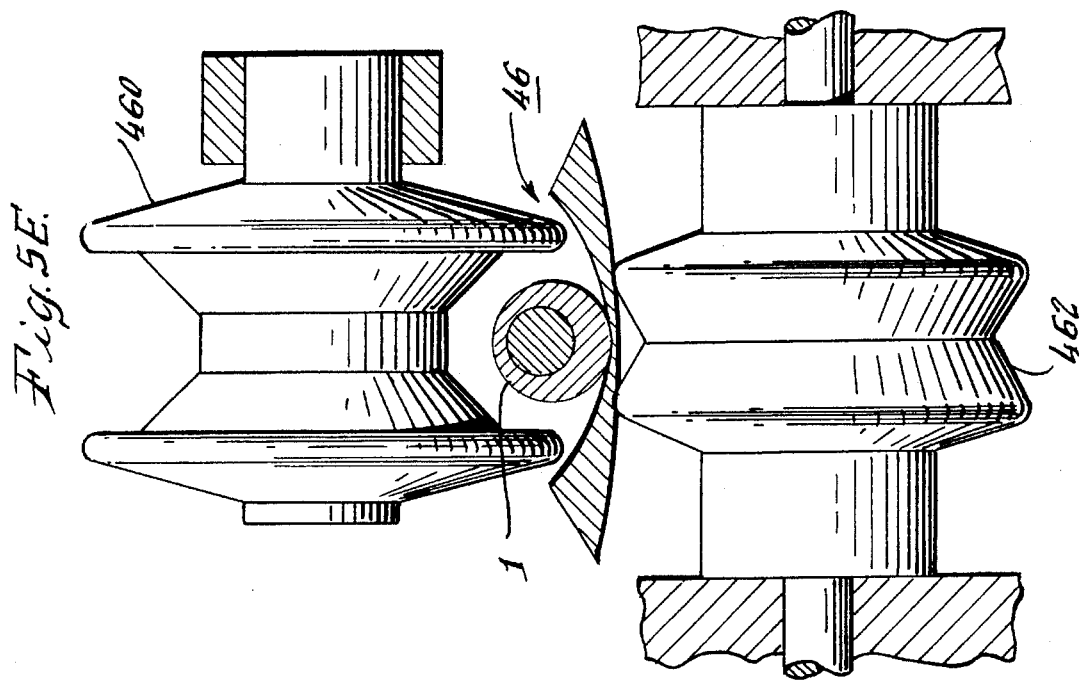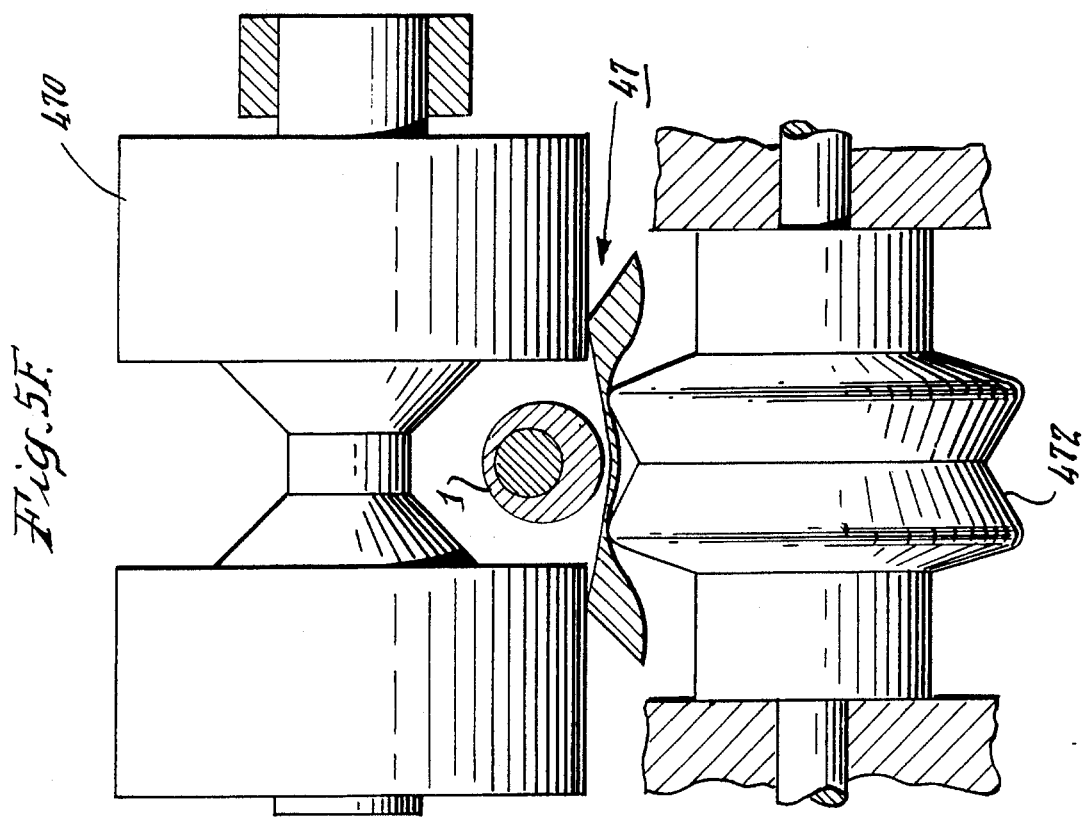

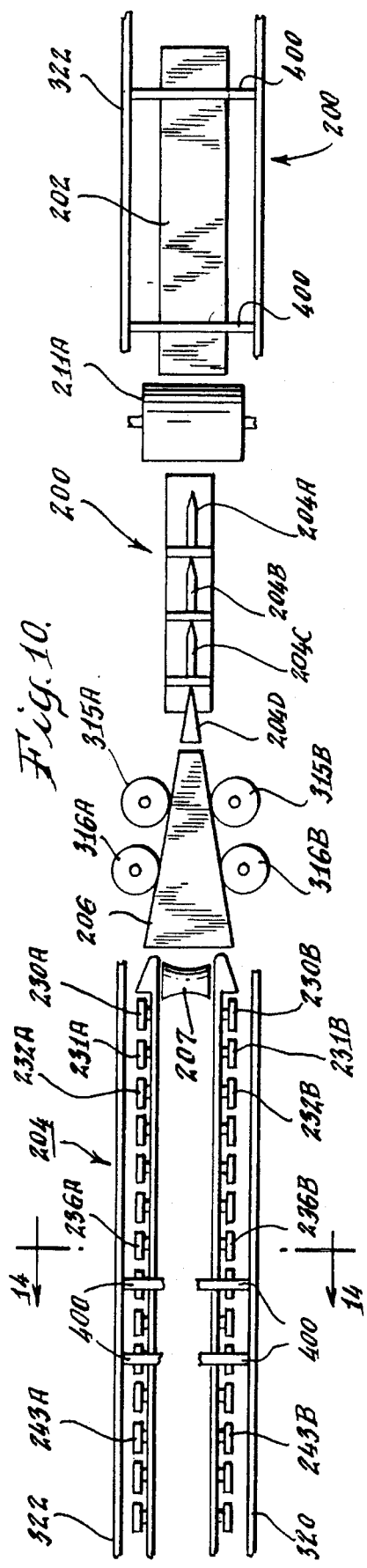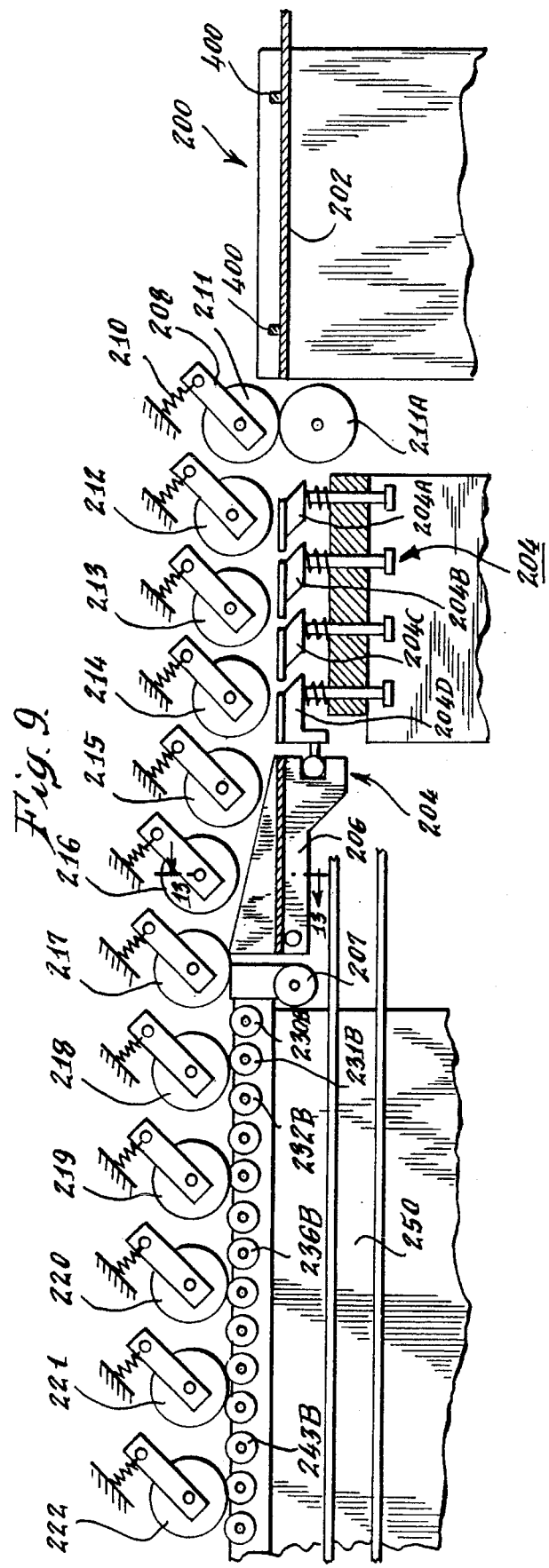

APPARATUS FOR REMOVING OUTER LAYERS OF PALM STALKS FROM PALM HEART

BACKGROUND OF INVENTION

In certain parts of the world, such as France and Brazil, the "heart" or center portion of the stalk of the palmetto palm tree is considered a great delicacy for human consumption. Until now, it has, for the most part, been harvested in the wild, primarily in Brazil, where it is packed fresh in tins for domestic consumption and for export.

The palmetto palm comprises a "meristem" portion, which is the lowest (approximately) 1.5 meters (4.9± ft.) of the exposed portion of the growing plant, and, above that, a main stalk portion, of which about ⅔+ meter (2.4+ ft.) is useful as a source for palmheart extraction. The meristem portion of the stalk is normally significantly larger in diameter (i.e., it is about 7.6 cm. or 3 inches) than is the upper portion of the exposed stalk, which is about 5.1 cm. or 2 inches in diameter. The two sections are connected by a tapered section of stalk which, in cross section, is roughly in the shape of an inverted, truncated cone. The processing steps for recovering palmheart sections traditionally have included field cutting an approximately 1 meter length of stalk from that portion of growing plant which includes a portion of the upper, main stalk that is about ⅔ meter (2.4 ft.) in length, and about ⅓ meter (1.2 ft.) of the upper part of the meristem portion, and the interposed tapered section, all as one piece. The object in such harvesting and the subsequent processing which takes place is to recover the very inside, or "heart" of the stalk from the entire harvested length. That traditionally has been done manually, using a knife to slit longitudinally the bark and the intermediate layer of the upper stalk portion, and by coring the meristem portion.

The narrower portion of the cut length of stalk is more or less round in cross section and has an outer bark layer which, while not as hard as some tree bark, is nevertheless very firm and tough. Therefore, the existing practice, as a prerequisite to removing the bark layer, is to steam the field-cut stalks in an autoclave for about ½ hour at about 125 degrees C. to soften the outermost or bark layer. More significantly, however, as harvested, the stalks are covered on the outside with fairly long, very sharp thorn-like projections. Even though they tend to lie at a shallow angle to the surface of the stalk rather than at right angles to it, these projections make the stalks difficult to handle and process. The outer bark layer encloses an intermediate layer which is also more or less circular in cross section, tough (but less tough than the bark layer), and, in the upper portion of a stalk whose outer diameter of the bark layer is about 5.1 cm. (2 inches), is about 3.5 cm. (1 ⅜ inches) in diameter. The intermediate layer typically is somewhat larger in the meristem portion, while the innermost or palmheart section is substantially of uniform diameter throughout the upper, tapered and meristem sections. The palmheart itself, which lies within the intermediate layer, is more or less circular in cross section and, in the example given, is about 1.9 cm. (¾ inch) in diameter. However, the periphery of the intermediate layer is eccentric with respect to the periphery of the outer bark layer. Further, the palmheart itself is eccentric but with respect to the periphery of the intermediate layer and usually with respect to the outer bark layer also. These circumstances are of less moment as to the meristem and tapered portions because coring type techniques may be used to remove the palmheart from those portions. However, these eccentricities, which (in cross section taken through the stalk) normally are not correspondingly positioned, complicate greatly the harvesting of the heart, particularly from the smaller diameter top section.

Traditionally, removal of the palmheart portions from these upper portions is done by people who use very sharp knives to split lengthwise first the outer bark layer of the stalk which is then torn away from that which underlies it, and then the intermediate layer which is then torn away from the underlying palmheart. The depth of any cut made in either of these layers to remove it from that which is underneath must be made with particular attention so as not to cut through it into the the underlying palmheart portion as well. Further, since the orientation of the eccentricities of the two outer layers is not the same, it is necessary usually to remove the outer and intermediate layers in separate, sequential steps, between which the stalks are reoriented by turning them. By this means, it is assured that the cuts are made through the thickest parts of each such layer, to minimize the possibility of cut-through. This is further complicated by the pronounced increase in the cross sectional "diameter" of the stalk moving past the tapered portion to the meristem portion from the upper or main portion of the stalk. (In the context of his disclosure it is to be understood that rarely is any portion of a stalk truly circular in cross section, but rather usually it is merely irregularly round, and thus by its "diameter" is meant the average of several mean distances taken across its cross-section). Since there is an annular ring in the region of the tapered portion which is comparatively weak that forms the juncture between the tapered portion and the upper portion of the stalk, usually bending the outer bark layer away from the upper part of the stalk which it surrounds causes it to snap at the juncture and separate from the the remainder of the stalk. Thereafter, the upper portion, now consisting of the intermediate layer-covered palmheart portion is severed from the remainder of the stalk and the palmheart is removed from it by linearly slitting its intermediate layer and stripping that layer away from the underlying palmheart core. It is to the phases of such removal of the outer bark form the upper portion of the stalk, severing that upper portion from the remainder of the stalk, and removal of the intermediate layer of that upper portion from the palmheart which it surrounds that this invention is directed.

Concurrently with and/or sequentially and independently from those operations, the palmheart may be removed from the remainder of the original stalk, which now consists of the bark covered meristem portion and the adjacent bark covered tapered portion, by coring it out, manually, or by using mechanical means such as a tubular knife that is thrust axially to separate and extract the palmheart portion from it.

Obviously, all of this is very labor intensive, and since the recovered palmheart cannot be preserved for an appreciably length of time, must be done at or very near the place of harvesting. For these reasons, the price for this commodity traditionally has been very high. Recently, there have been efforts to raise palmettos for palmheart harvesting on plantations, to make the growing and harvesting of them easier and less expensive and to facilitate the rapid transport of cut stalks to processing locations. This also produces products of higher quality and better uniformity than can be obtained with cuttings from growth in the wild. The less wide range in "diameter" of plantation stalks, whose ages are more easily unified than is possible with wild stock, has led to interest in automating selected phases of the process, since this also can have the additional advantages of improving the quality of the product and making processing less expensive.

Accordingly, it is an object of this invention to provide means to recover palmhearts from palm stalks.

Another object of this invention is to provide such means which is mechanized.

Still another object of this invention is to provide means for satisfying one or more of the foregoing objectives which is adapted to accommodate substantial diameter variations between and within individual palm stalks as they are being processed.

Yet another object of this invention is to provide means for satisfying one or more of the foregoing objectives which is adapted to remove the intermediate and outer layers from the associated palmheart while preserving the associated meristem portion for further processing.

STATEMENT OF INVENTION

Desired objectives may be achieved through practice of this invention, preferred embodiments of which comprise a bark remover apparatus and methods for removing the bark from the upper portions of stalks of palm which consist of an upper stalk portion and a meristem portion that are continuous with an interposed tapered portion, cutter apparatus and methods for severing the bark-stripped upper portion from the remainder of the stalk, and intermediate layer remover apparatus and methods to remove the upper portion intermediate layer from the palmheart which underlies it. In selected embodiments, the bark remover is in tandem with the stalk cutter, from which the upper stalk portions pass to the intermediate layer remover while the remainder of the stalk, consisting of the meristem/tapered portions are further processed or discarded.

Bark removers, according to this invention, comprise propelling means, preferably in the form of pusher means for pushing the meristem end of cut lengths of palm stalk to propel them axially along a travel path. So propelled, palms stalk lengths come into contact with outer bark cutter and spreader means, preferably in the form of at least one plow-shaped knife, that is positioned in the path of travel, preferably at the top, of that portion's bark layer, to cut the bark longitudinally and to spread it open along the cut line. Thereafter, the stalk is propelled through progressive spreader means, preferably in the form of a series of wheel units that are arrayed in substantial alignment with said cutter means, each of which units includes opposing sets of wheels, selected ones among which are circumferentially grooved to accommodate the mass of the de-barked upper portion, with the wheels in each set being adapted to engage cooperatively and retain the stripped bark layer therebetween and to increase the distance between the cut edges of the bark layer sequentially along said travel path. The bark cutter and spreader means, and selected portions of said progressive spreader means are adapted to be withdrawn from contact with the stalk prior to their being engaged by the tapered portion of the stalk, to enable that portion and the meristem portion to pass without being arrested due to their being larger in diameter than is the upper portion of the stalk. The stalk is then propelled to bark bending means, preferably in the form of a stripping plow which engages the inner surface of the stripped bark and is angled with respect to said travel path to cause said bark to bend away from the core which underlies it and, ultimately, to snap off at the bark ring that is located at the juncture of the upper portion and the tapered portion of the palm stalk.

Cutters according to the present invention comprise means for receiving lengths of palm stalk from the upper portion of which the bark layer has been removed, and for cutting said upper portion free from the remainder of the stalk which consists of the tapered portion and the meristem portion to which it is attached.

Intermediate layer removers according to this invention comprise pusher means for pushing lengths of the upper portions of palm stalk which has been de-barked and from which the remainder of the stalk have been cut, axially into a cutter and spreader means, preferably in the form of a plow-shaped knife, which is positioned in the path of travel of said intermediate layer, preferably at the bottom, to produce a longitudinal cut in the intermediate layer and to cause it to pull away from the palmheart which underlies it and the cut edges to move progressively further away from each other, and progressive spreader means, preferably in the form of wheel devices, to open the cut, intermediate layer progressively wider until the palmheart portion is freed.

DESCRIPTION OF DRAWINGS

This invention may be understood from the description which follows and from the accompanying drawings in which:

FIGS. 1A through 1D inclusive illustrate cross sectional and side views of products which may be processed by this invention, FIG. 3 is a side elevation view of a palm stalk bark stripping machine which embodies this invention, FIG. 4 is an end cross-sectional view of the embodiment of this invention shown in FIG. 3, taken through section 4—4' in FIG. 3, FIGS. 5A through 5F are end cross-sectional views taken through roll units 42 through 47 respectively of the embodiment of this invention as shown in FIG. 3, FIGS. 6A and 6B are side and top views respectively of an upper knife assembly useful in the embodiment of this invention shown in FIG. 3, FIGS. 7A and 7B respectively are side and top views respectively of a lower knife assembly useful in the embodiment of this invention shown in FIG. 3, FIGS. 8A through 8C are side, top and front end views respectively of bark bending devices useful in the embodiment of this invention shown in FIG. 3, FIG. 9 is a side elevation view of an intermediate layer stripping machine which embodies this invention, FIG. 10 is a top view of the embodiment of this invention shown in FIG. 9.

DESCRIPTION OF PREFERRED EMBODIMENTS

Figure 2:
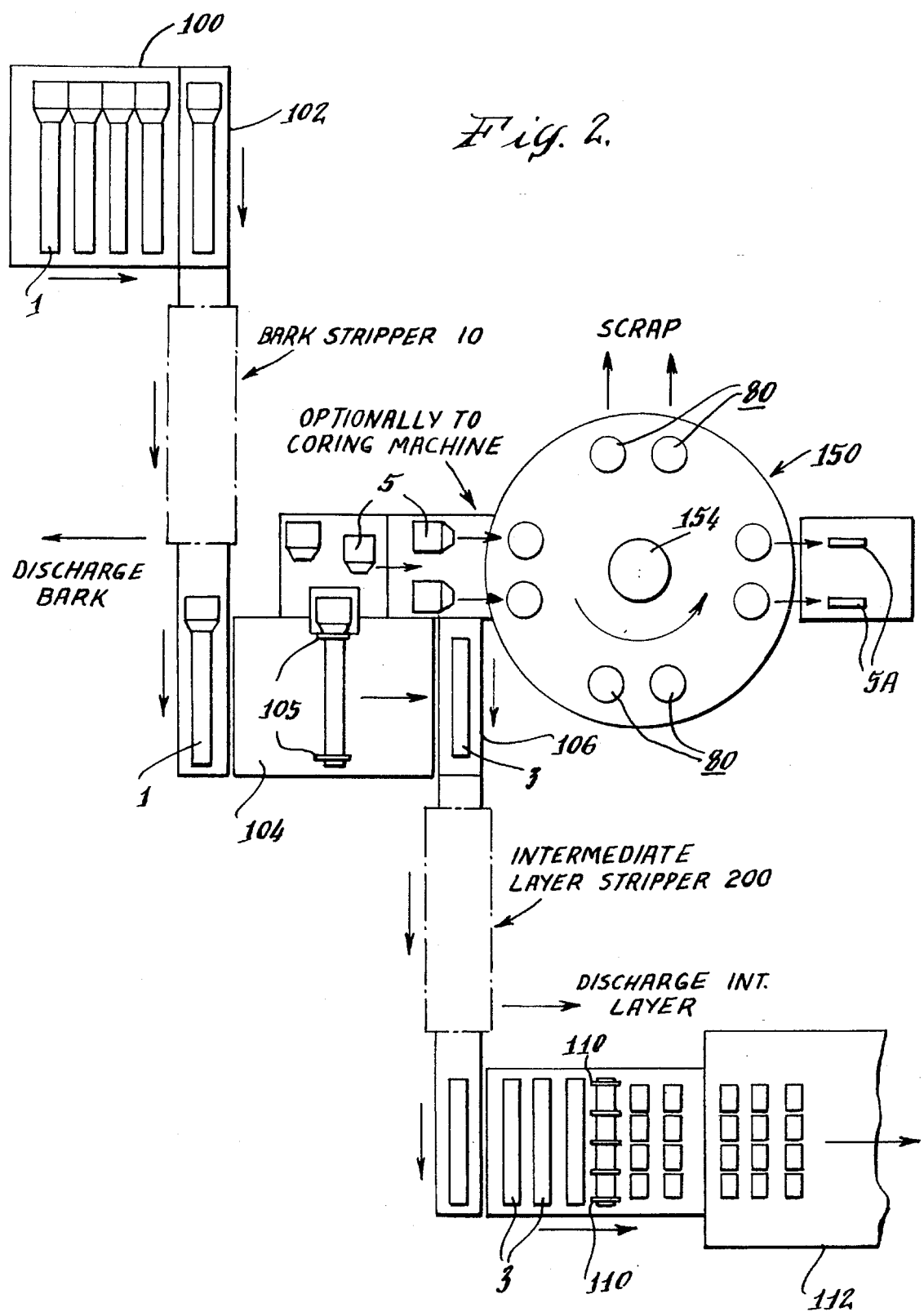
FIG. 2 is a schematic plan view of production apparatus utilizing an embodiment of this invention.
Figure 5A:
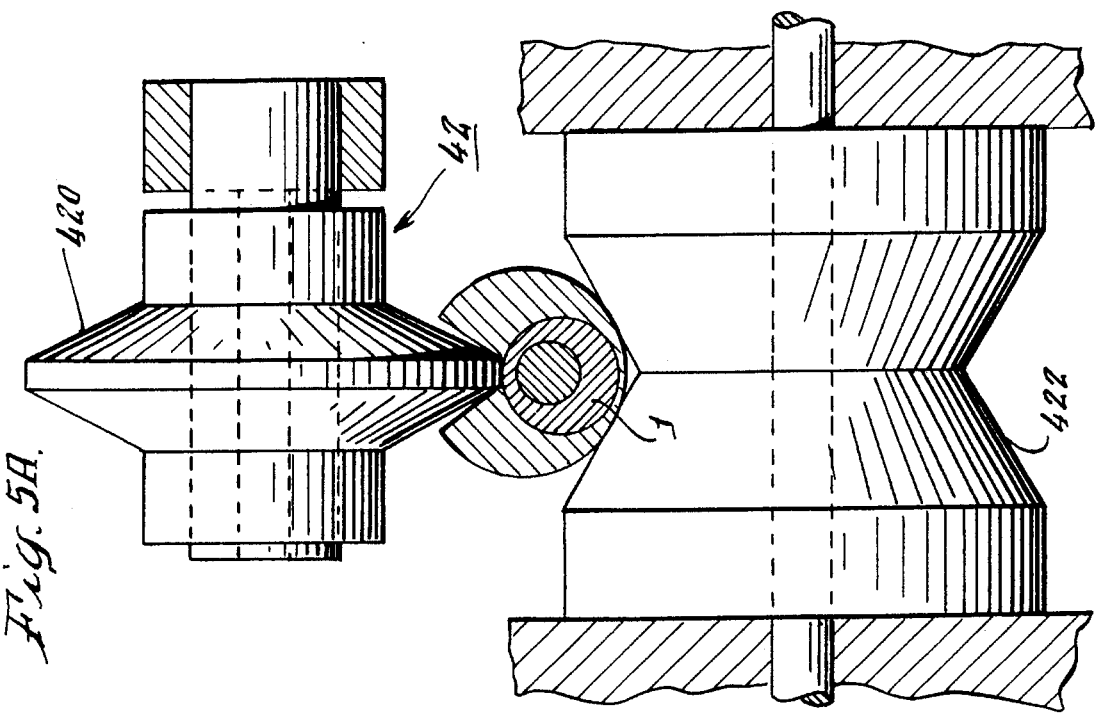
Figure 5B:
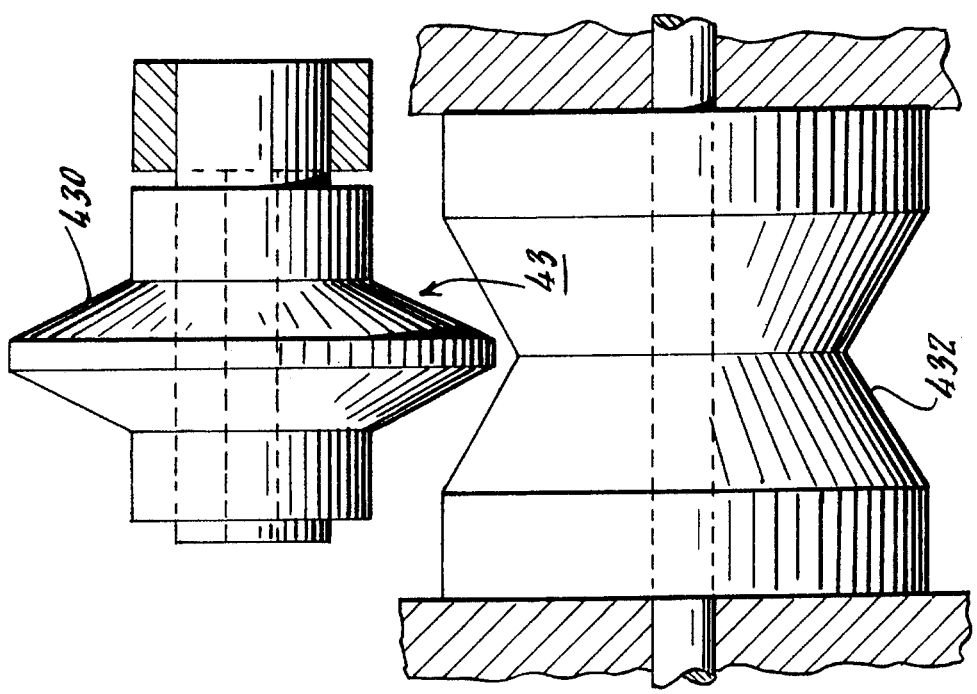
Figure 5C:
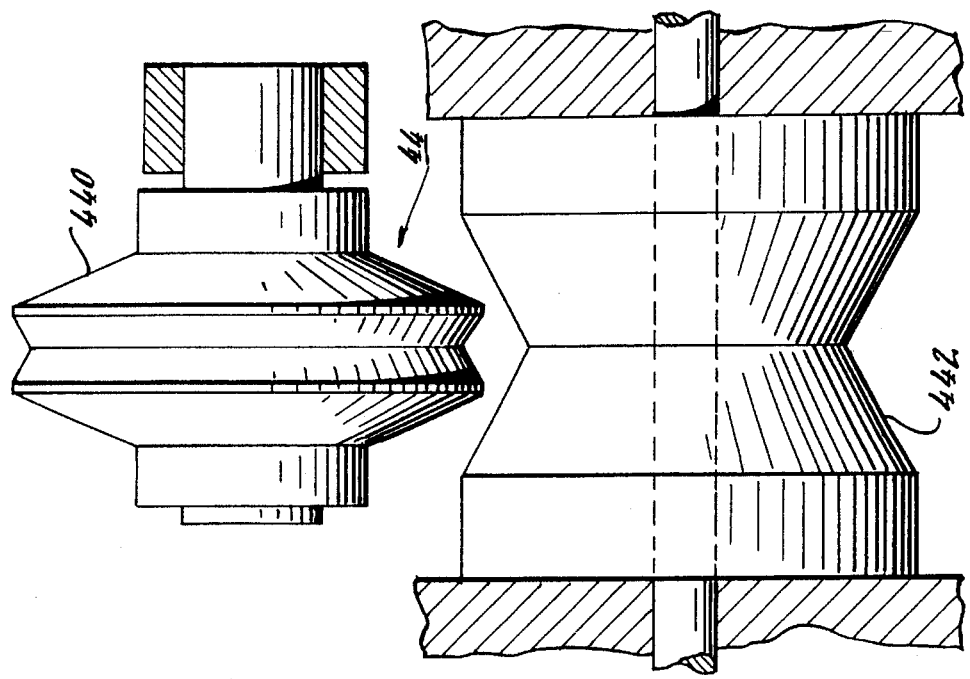
Figure 5D:
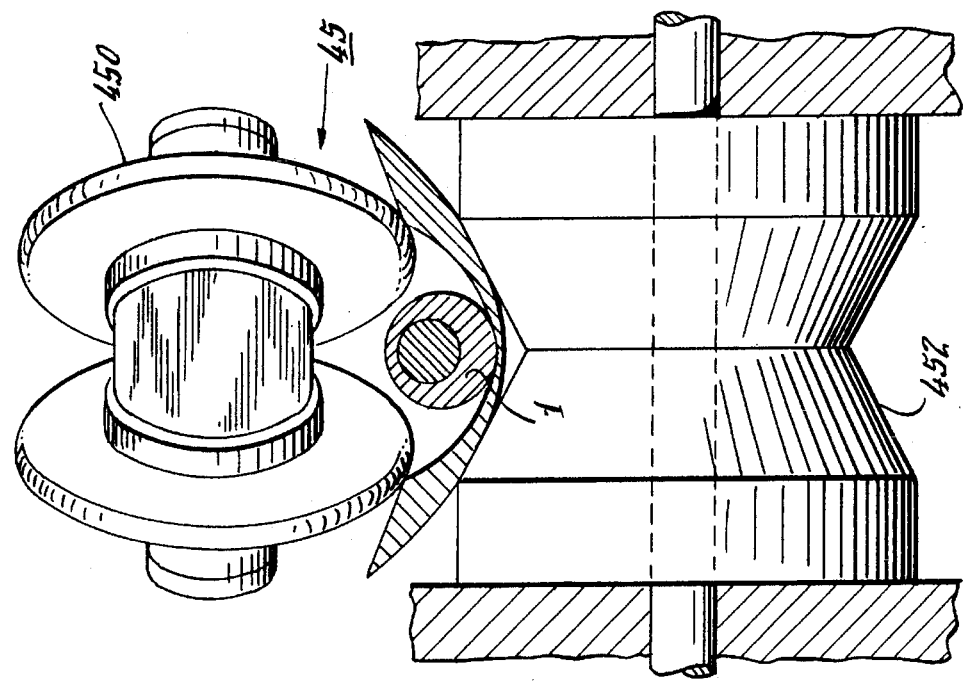

Referring first to FIGS. 1A through 1D inclusive, there are depicted cross sectional and side views of a palm stalk 1 of the type which embodiments of this invention may be used to process. FIG. 1A is a cross section of the main portion of such stalks from which the desired palmheart 4 is to be removed. It consists of an outer layer 2 that is somewhat tough, but also somewhat resilient, and has thorn-like barbs 2A extending from its outer surface. Although shown as being round in cross section, the stalk typically is more or less round, and, in the upper region (i.e., the portion of the stalk immediately above the tapered portion 5 of the growing plant) is about 2+ inches (5.1+ cm.) in "diameter". Within the bark layer 2 is an intermediate layer 3, which, although somewhat less tough and without the thorns which project from the outer layer, also is more or less round and typically, in this region of a stalk of this size, is about 1.37 inches (3.5 cm.) in diameter. However, characteristically, the outer periphery of the intermediate layer 3 is eccentric with respect to the outer peripheral surface of the outer layer 2. Thus, the thickness of the outer layer 2 to varies significantly from place to place radially around the stalk, viewing the stalk in cross section. Within the intermediate layer 3 is the palmheart 4 that is to be recovered. That, too, is more or less circular in cross section, but about ¾ inch (1.9 cm.) in diameter in this region of the example given. However, the outer peripheral surface of the palmheart 4 is also eccentric with respect to that of both the intermediate and bark layers by which it is encased. Further, there usually is no predictable relationship between the degree or position of these two instances of eccentricity, one to the other. For these reasons, in removing the successive layers to get to the palmheart 4, the usual practice is first to make a linear knife cut of the type shown as 8A in FIG. 1A, through the thickest portion of the outer layer 2. This cut usually needs only to be part way through the bark layer, but, although it is not desirable to do so, limited penetration of the knife through to the intermediate layer may occur since ultimately the intermediate layer is discarded. The top position is selected because it provides the most depth for the cut and, therefore, less likelihood of cutting into the intermediate layer at the same time. Optionally, a second linear slit may be cut in the bark layer 2, as shown at 8B, roughly opposite the first cut, to facilitate breaking the bark layer 2 away from that which underlies it. To accommodate the lack of congruence of the eccentricities as between the two layers while still making cuts in the thickest portion of each the stalk is next reoriented by rotating it so that a cut, corresponding to that shown as 9A in FIG. 1B, may be made through the intermediate layer 3, again in its thickest portion. In all instances of making cuts in layers, care is to be exercised to avoid the cuts being so deep as to invade the next adjacent inner layer.

FIGS. 1C and 1D illustrate side views of the same type of stalk. They show, in particular, the tapered portion 5 which is interposed between the meristem portion 7 that, in the growing plant, is closest to the ground, and the upper portion 1 which joins the tapered portion 5 at a comparatively weak annular ring 6 in the outer bark layer. In order to ensure maximum retrieval of useful palm heart, the top part 7 of the meristem is cut as part of the harvested palm stalk, the difficulties in handling it notwithstanding. It is particularly to be noted that the annular ringlike region 6 in the outer bark layer 2 at the juncture between the tapered portion and the upper portion of the stalk is more susceptible to breaking upon being flexed than is the rest of the outer layer 2. As will be apparent from what follows, this is a characteristic upon which embodiments of this invention capitalize.

FIG. 2 illustrates an embodiment of this invention which is adapted for use with other devices in recovering the palmheart section from cut lengths of palmetto palm stalks. As shown at the top of this illustration, raw palm stalks are fed by conveyers 100, 102 to a bark stripper 10. They will have been cut in the field in continuous lengths, each of which includes a relatively small diameter top portion of the stalk, a relatively larger diameter meristem portion, and an intermediate tapered section connecting the two. After the outer bark layer in the smaller diameter top section has been removed in the bark stripper 10, that bark is discharged. The palm stalk, which now consists of the de-barked smaller diameter top portion still attached to the intermediate tapered and larger diameter meristem portions with the bark still on them, is passed to a cutter 105 in which the smaller diameter top portion "T" is severed from the remainder. Optionally, the remainder then may have the palmheart removed from it, manually or as by it being moved by conveyors to a corer device 150. The smaller diameter upper portion "T" of the palm stalk, which, following the initial bark-stripping operation, includes the inner, palmheart core and its surrounding intermediate layer, is carried by a conveyor to an intermediate layer stripping device 200 where the intermediate layer is removed and discarded. The palmheart core that is left may then be carried to a second cutter device 110 where it is cut to desired lengths and then put through a scalder to stabilize it organically before they are packed.

FIG. 3 illustrates a bark stripper 10 which embodies this invention. It includes a main frame upon which is affixed a series of roll units 41, 42...47, each one of which units includes an upper and a lower roll set which are in opposing relationship, one above the other. Thus, in roll unit 41, roll 410 sits above and is more or less axially aligned with roll 412. Similar relationships exist between rolls 420 and 422 in roll unit 42, rolls 430 and 432 in roll unit 43, and so forth. As is shown in FIG. 3, the top rolls 410...470 in the roll units are supported by pneumatic lift mechanisms by means of which, in response to sensors appropriately positioned along the path which palms stalks follow as they proceed through the machine, cause the top roll in each roll unit to lift before the tapered portion of each such stalk arrives at that roll's location. Thus, for example, lift mechanisms 26, 28, 20, 32 are adapted to raise rolls 440, 450, 460, 470 respectively, in each case, through operation of its associated pneumatic cylinder, such as cylinder 26A via the mechanical linkage 26B in mechanism 26. By this means, particularly since the lift drive means are pneumatically actuated, constant pressure may be maintained as between the rolls in each unit regardless of stalk diameter and/or shape variations, while, at the same time, the radical size changes introduced by the tapered sections and the larger lower meristem portions do not create an impediment to the free passage of the stalks through the machine. In cross-section, the two rolls comprising roll unit 41 are substantially cylindrical, with each having a V-shaped groove in the center to accommodate and align the palm stalks being processed so that they will pass directly to the next roll unit in the sequence. A front elevation view of roll unit 41 (with the upper roll 410 having been raised to clear the path of travel of the pusher plate 11) is shown in FIG. 4. Front elevation views of the configurations of the rolls comprising each of the roll units 42 through 47 inclusive are shown respectively in FIGS. 5A through 5F. It will be noted that at least one, and usually both, of the rolls in each of these units are also adapted, by the inclusion of center depressions, to accommodate palm stalks passing between the rolls while keeping the stalks properly aligned so that they will pass from unit to unit sequentially in tandem. Further, in each case, the two rolls in each unit effectively form, as well, holding surfaces by which, as the palm stalks pass between them, not only is the core of the stalk (consisting of the heart and intermediate layer) positionally retained as described above, but the bark layer is positioned between and is guided by other corresponding surfaces of those rolls. The effective width of the latter surfaces increases incrementally in the direction of travel of each stalk. The effect of this is for the bark layer to be progressively peeled away from the core of the stalk which underlies it.

Figure 6A:
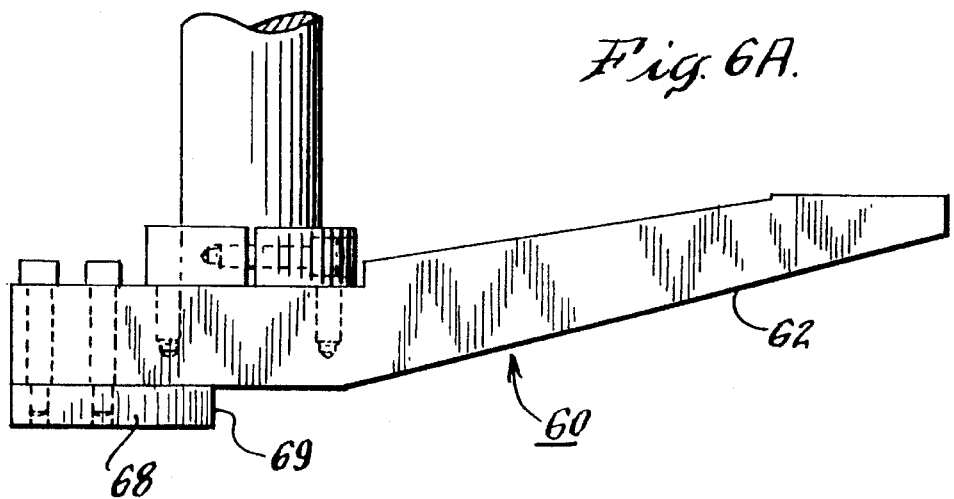
Figure 6B:
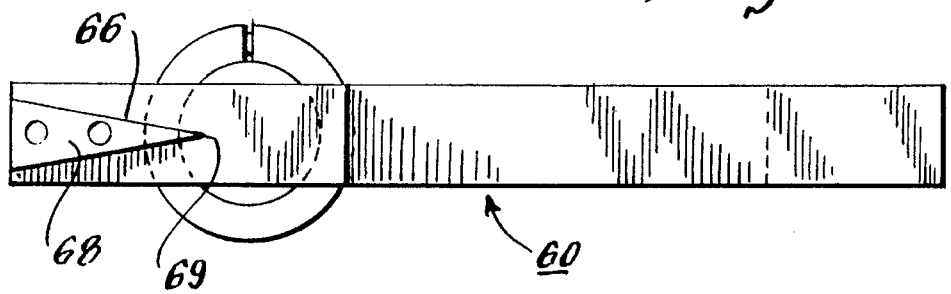

This sequence is initiated by a cutter/spreader means, preferably in the form of a plow-shaped upper cutter blade 60 as shown in FIG. 3 and in greater detail in FIGS. 6A and 6B. The cutting blade 68 in that assembly 60 is characterized by having a front cutting edge 69 and flared main walls 66. It is positioned so that its cutting edge 69 will be impinged upon by front edge of the bark layer of an oncoming palm stalk. The flared main walls 66 start the spreading open of the knife cut in the bark layer. Optionally, a second, lower knife blade assembly 90 shown in FIG. 3 may also be also used to facilitate removal of the bark layer from that which underlies it. Such a supplementary blade lower knife assembly 90, which is shown in detail in FIGS. 7A and 7B and is discussed below, utilizes an upstanding cutting blade 94 which needs only to split the bark layer without also having to spread it. As shown in FIGS. 6A and 6B, the upper knife blade 60 includes a guide ramp 62 to guide oncoming palm stalks into the blade cutting edge 66. The blade element 68, which is adapted to be easily removed for purposes of sharpening and replacement, is in the form of an arrow or wedge shaped "plowshare" knife assembly which also includes a progressively wider tail portion and is supported on a mounting block 70. The blade 68, when so positioned that its cutting edge 69 will be impinged upon by the front end of oncoming palm stalks, will make a linear cut down the length of each stalk as the stalk moves along past the blade. At the same time, its flared, trailing portion, effectuated by its side walls 66, serves as a wedge and causes the wall of the cut bark layer to separate along the cut line. In this process, the separation of the outer layer from the intermediate layer which is initiated by the upper knife assembly 60, progresses not only linearly down the length of the stalk along the cut line, but also circumferentially around the stalk from the top down both sides, through operation of the series of wheel units 42...47 as shown in FIG. 3 and as herein described.

Figure 7B:
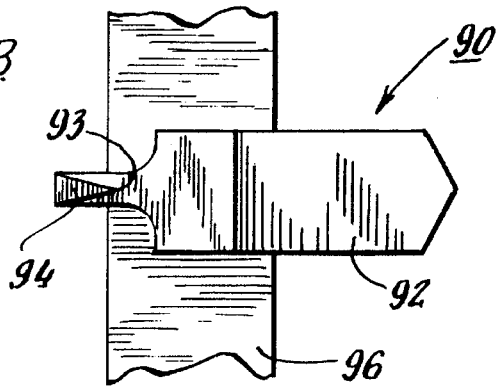
Figure 7A:
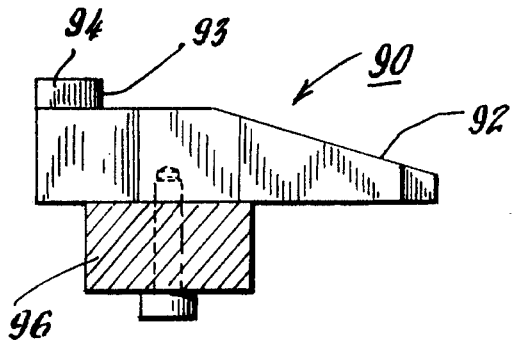
Figure 8C:
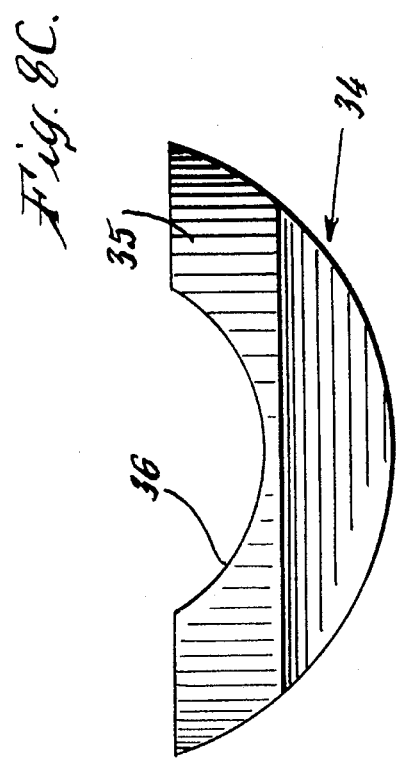
Figure 8B:
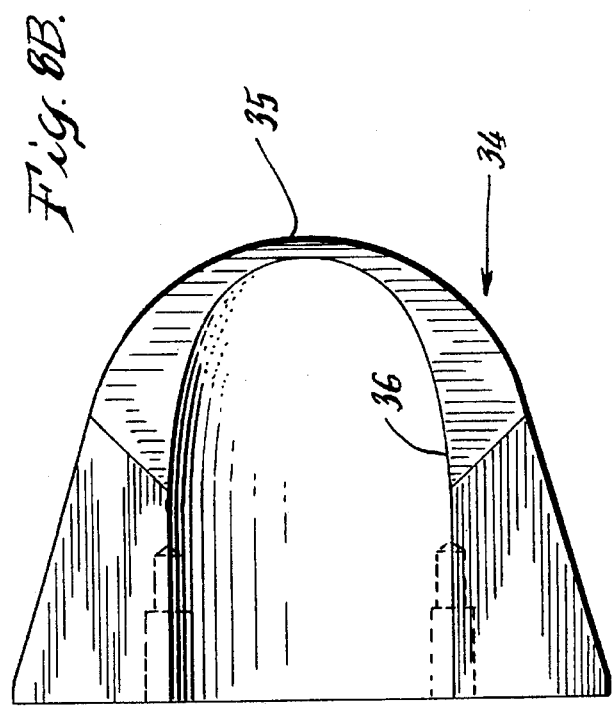
Figure 8A:
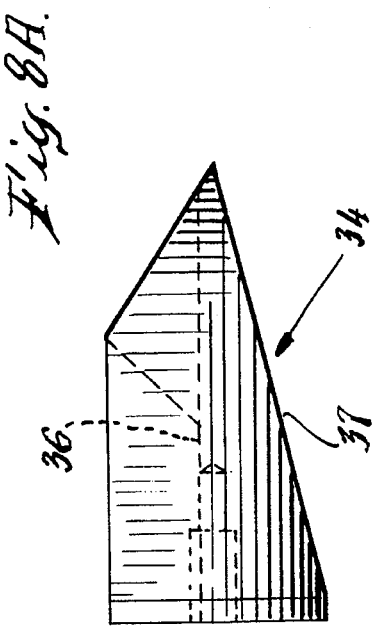

When the optional lower knife blade 90 is used, it functions comparably to the upper blade insofar as cutting is concerned. That is, the cutting surface 93 of the lower knife assembly blade 94 as shown in FIGS. 7A and 7B is impinged upon by the oncoming front edge of the bark layer of a palm stalk to create a longitudinal slit along its lower part. Although knife damage to the intermediate layer is not so critical as is knife damage to the palmheart, the intermediate layer ultimately being discarded, damage by either or both of the upper and lower knives may be avoided by setting their cutting depth shallow so as not to pierce all the way through the layer being cut. Since the lower knife blade particularly does not need to penetrate the entire thickness of the bark layer, its height setting above its associated supporting ramp needs only to be less than the minimum thickness of the bark layer to be cut. The lower knife includes an alignment and supporting ramp 92 to guide the oncoming stalks toward the knife blade edge 93. The vertically oriented, wedge shaped knife blade 94 that is attached to a fixed mounting bar 96 performs the actual cuts made at this location, again, by the assembly being so positioned that its knife blade will be impinged upon by the front edge of the outer or bark layer of palm stalks being propelled through the machine. This assembly, however, does not need to include the flaring structure of the type described for the top knife assembly 60 since the primary objective of the lower assembly 90 is merely to produce a linear slit down the length of the surface of the stalk that is positioned more or less opposite that produced by the assembly 60. It does not simultaneously have to flare the bark away from its underlying core since the spreading action taking place at the top usually suffices for removal of the bark layer. Another constituent of the bark stripping machine shown in FIG. 3 is a debarker plate 34 of the type shown in FIGS. 8A through 8C. It presents a convex support surface 36 to the outside surface of the intermediate layer of an oncoming palm stalk from which the outer bark layer has been at least partially stripped. Since, occasionally, some bark may adhere to the outer surface of the intermediate layer, the debarker plate 34 may also be provided with a sharp leading edge 35 to strip any remaining bark from the upper portion of the stalk. The debarker plate 34 is also provided with a deflector surface 37 by means of which the inside surface of the stripped bark portion of oncoming palm stalks is interdicted and is angled downward with respect to the path of travel of the bark. As will be apparent from the description which follows, the intermediate layer/palmheart portion of a palm stalk from which the bark has been separated substantially around its entire circumference nearly to the tapered portion annular ring will be propelled through the machine above the deflector plate 34, supported by the convex surface 36. The deflector surface 37 of the plate 34, impinging upon the inner surface of the stripped bark, causes the bark to be further pulled away from the intermediate layer as the stalk moves along, until the weak, annular ring at the beginning in the tapered portion of the stalk arrives at the location of the deflector plate 34. At that point, the bark layer breaks off from the remaining portion of the bark, and the stalk now consists of the bark covered meristem and the tapered portion immediately adjacent to it, still attached to the debarked core of the upper portion of the stalk. The stripped bark is then allowed to fall away to be discarded. The smaller diameter upper portion of the stalk from which the bark has now been stripped, is subsequently severed from the remaining portion of the stalk, and the two segments thereby produced may then be further processed as herein described.

The operation of the knife blades and the roll units being passive, means also is provided to impel the palm stalks through the machine. To that end, a motor 18 which may incorporate a speed reducer, powers a drive chain 20 that is held under tension by a tensioner 22 and, through mounting in a bearing 24, drives a pair of roller chains 12, which travel through closed paths encircling each side of the device. The roller chains, in turn, propel a series of pusher plates 11 that are designed to impinge upon and push the meristem end of palm stalks to propel them through the device, and are affixed by brackets 13 to the roller chains. This arrangement is shown in greater detail in FIG. 4, which is a cross-sectional end view of the bark stripping machine 10, taken through lower roll 412.

At this point, since the stalks are still in a single piece made up of all three portions (i.e., the upper, tapered and meristem portions), with the smaller diameter upper portion debarked, the latter portion may be removed from the rest by use of a rotary cutter such as the cutter 105 shown in FIG. 2 or other known per se means, and passed on to an intermediate layer stripper of the type hereinafter described. The remainder, now consisting of the tapered and meristem portions, may be passed on to a coring device 50 or other mechanical coring means, or hand cored in the traditional fashion.

Figure 12:
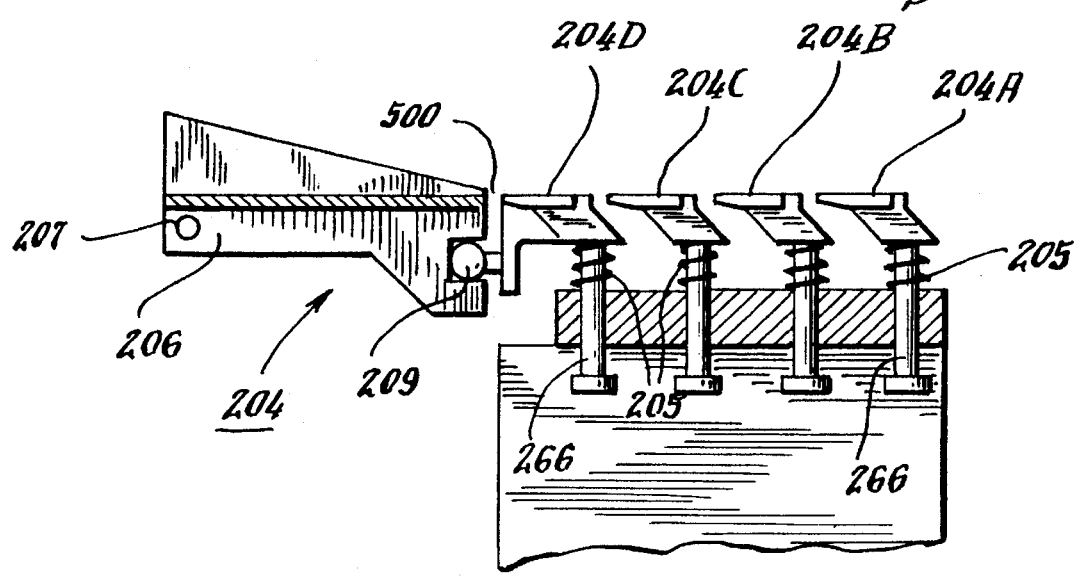
FIG. 12 is a cross-sectional view of an assembly of knife structures useful in the embodiments of this invention shown in FIGS. 9 and 10 utilizing the knife structure shown in FIG. 11.
Figure 11:
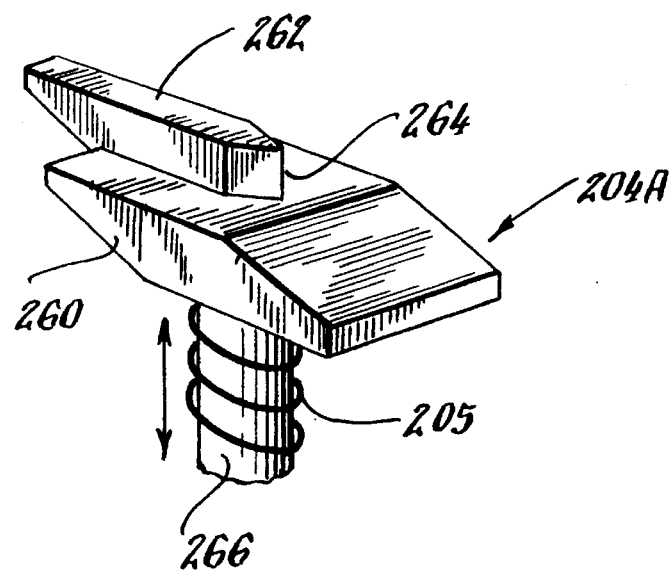
FIG. 11 is a perspective view of a knife structure useful in the embodiments of this invention shown in FIGS. 9 and 10.
Figure 13:
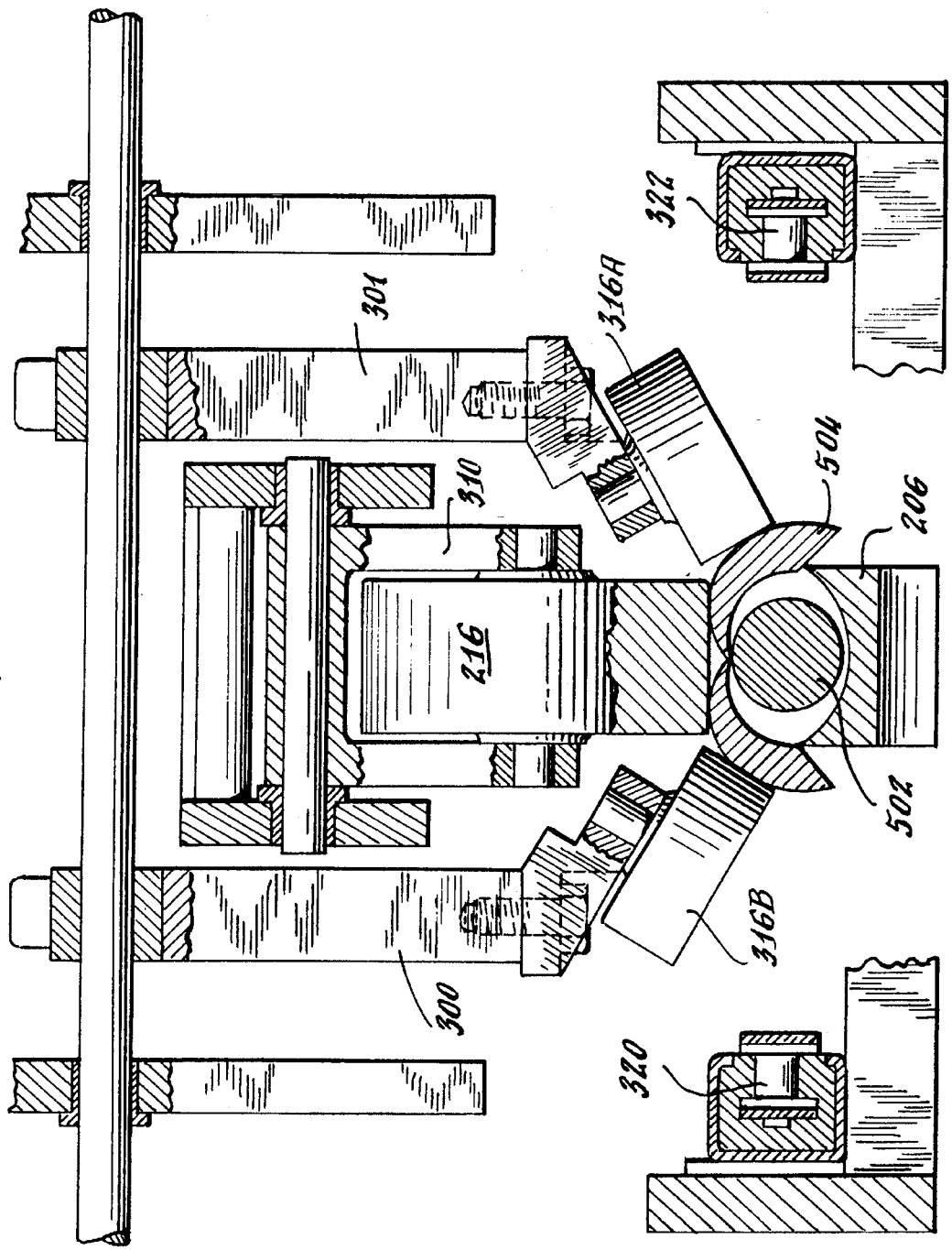
FIG. 13 is a cross-sectional view of this invention taken through roll #216 of the embodiment of this invention shown in FIGS. 9 and 10.

Intermediate layer stripper mechanisms embodying this invention are depicted in FIGS. 9 through 13 inclusive. As shown in FIGS. 9 and 10, severed sections of upper stalk portions, which include the palmheart core with its associated intermediate layer still surrounding it, move from right to left as they pass through the equipment. Thus, FIG. 10 shows in plan view and FIG. 9 shows in side elevation view, an intermediate layer stripper 200 which includes a receiving trough 202 in the form of an inverted "V" whose long axis is oriented to line up directly with the knife sets hereinafter described and sets of roller chain drives 320, 322 in the form of endless, sprocket-driven loops that extend down the entire length of the machine, one on each side. The roller chain drives include pusher plates 400 similar to those shown in FIG. 4, by means of which upper stalk sections from which the intermediate layers are to be removed may be propelled through the machine. Upper stalk sections leaving the table 202 are held between rolls 211A and 211. The latter is mounted on a pivotable arm 208 that is biased toward closing on the opposing roll 211A by action of biasing means such as the spring 210 to ensure firm positional orientation and retention of the stalks while accommodating size and shape variations in them. The rolls 211 and 211A properly align the stalks toward the knife blade set 204 which is next in the sequence "seen" by stalk sections as they pass through the machine. This knife blade 204 set is shown in greater detail in FIG. 12, and includes individual knife blades 204A...204D. Of course, the exact number of such blades may be varied appropriately to the intended use. A representative one (204A) among these knife blades which is shown in perspective view and even greater detail in FIG. 11. Each such blade is resiliently held in position as by a mounting spring 205 which supports the base of a mounting shaft 266, to the top of which is affixed a positioning ramp 260. The oncoming edge of the intermediate layer of upper stalk sections are supported by the ramp 60 and guided so as to impinge upon and be longitudinally cut by the cutting edge 264 of the knife portion 262 that is positioned atop each such ramp 260. As may be seen from FIG. 12, these knife portions 262 may advantageously have elongated, straight sides as shown in FIG. 9 through 11 since a function of the knives, in addition to making the described cut, is also to keep the stalk section from rolling axially. To create a comparatively long continuity of such anti-rolling support while the spring-biased rolls 212...214 hold the stalks against such knife blades, and, at the same time, to accommodate dimensional and shape variations in the stalks, a series of such knife blades is used rather than a single long or short one. The last knife blade in the series (204D) is flared at the egress end in order to start opening the longitudinal slit that by then has been made in the intermediate layer, and is followed sequentially by a spreader unit 206. As is shown in greater detail in FIG. 10, the latter includes associated retaining wheels 315A, 316A, 315B, 316B which are positioned two on each side of the spreader 206. These wheels catch the cut edges of the slit intermediate layer 504 as it passes through and retain them against the flaring surfaces of the spreader 206 so as to implement the peeling away of the intermediate layer from the underlying palmheart portion. To facilitate this, the upper, palmheart receiving surface of the spreader 206 is concave in cross-section. As will be seen from FIGS. 9 and 13, the palmheart sections are "backed" by spring biased wheels 215...217, and the retaining wheel sets 315A, 316A and 315B, 316B are oriented so as to bear under spring or other bias against the outer side walls of the spreader 206. As shown in FIGS. 10 and 12, the spreader 206 is pivotally mounted to the machine frame at the front by means of pivot 207 and is moveably interconnected to the last (flared) knife 204D by interconnection means 209. This ensures that the relative position of the front of the spreader 206 vis-a-vis the rear of the last knife 204D will be maintained so that the proper alignment of upper stalks will not be lost as they move through the machine at this point. The condition of the stalk section and the interrelationship of machine parts at this point may be seen in FIG. 13, a cross-section taken through roll 216, from which it will be seen that while the top roll 216 holds the palmheart 502 down toward the concave upper surface of the plow or spreader 206, the now longitudinally split sections of intermediate layer 504 from the stalk are in the process of being flared open by the sides of the spreader 206. At the same time, they are held against them by the wheels 316A, 316B which are kept in place by supports 300 as the top roller 216 is supported by its support member 310.

Figure 14:
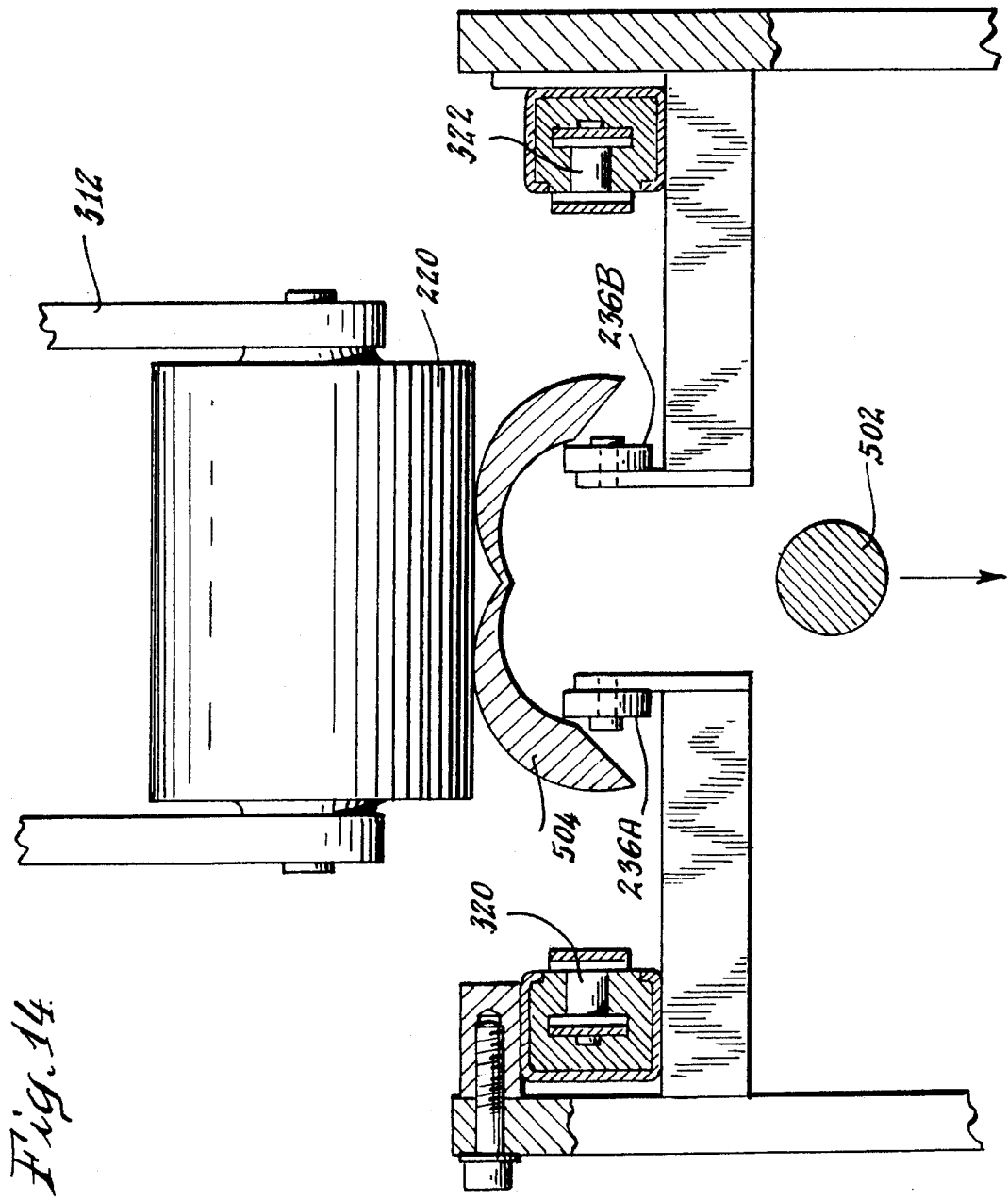
FIG. 14 is a cross-sectional view of this invention taken through roll #220 of the embodiment of this invention shown in FIGS. 9 and 10.

Proceeding in the direction of travel of the stalks down the length of the machine, the top rolls 211...222, all of which are substantially cylindrical in shape, are progressively wider and are biased downward by means such as springs. The reason for this will be apparent from comparing FIG. 13 with FIG. 14; the latter being a cross-section taken later in the processing sequence at approximately the position of top roll 220 which is held in operating position by the downwardly spring-loaded support member 312. From FIGS. 9 and 10 it will be seen that in processing sequence following the spreader 206 is a parallel series of bottom rolls arrayed one set 230A...243A on one side of the machine and one set 230B...243B on the other side. These rolls are so oriented that they bear on the inside of the intermediate layer after it has been cut, spread and peeled, more or less, away from the outer surface of the palmheart core 502, in response to the downward pressure being applied to the top of the outer surface of the intermediate layer by the succession of top rolls 217..222. As the slit upper stalk section moves along, the downward bias of these upper rolls causes the intermediate layer 504 to peel away to a progressively greater extent from the underlying palmheart core 502 while both are being held aloft by the cooperative action of the top and bottom roll sets until the point is reached where the intermediate layer no longer is sufficiently bound to the palmheart core 502 to be able to hold it. At that point, the core 502, by gravity, drops free, to be recovered, cut to length as desired, as by a cutting device such as the cutter 110 shown in FIG. 2, or manually, and packaged, while the intermediate layer section is discarded.

From the foregoing it will be seen that it is possible, through practice of this invention, to harvest, process and package palmheart automatically, accommodating the wide variety in physical conditions which are typical in such products. Accordingly, it is to be understood that the embodiments of this invention herein illustrated and discussed are by way of illustration and not of limitation, and that a wide variety of embodiments may be made without departing from the spirit or scope of this invention.

We claim:

1. For use in processing stalks of palm that include throughout a palmheart core surrounded by an intermediate layer and an outer bark layer, and have a tapered section that is positioned between and is continuous with a larger diameter meristem section and a smaller diameter section which join at an annular ring, apparatus for removing the palmheart core from the center of the smaller diameter section of said stalks comprising smaller diameter section bark stripping means, stalk cutting means and intermediate layer removal means, wherein said bark stripping means comprises, support means for supporting each stalk of palm that includes throughout a palmheart core surrounded by an intermediate layer and an outer bark layer, and has a tapered section that is positioned between and is continuous with a larger diameter meristem section and a smaller diameter section which join at an annular ring as it traverses said bark stripping means, propelling means for propelling said stalk, smaller diameter section first, longitudinally past and sequentially through the following structural elements of said bark stripping means, cutter/spreader means for longitudinally cutting said bark of said smaller diameter section, creating cut edges in said bark which face each other, and for spreading said cut edges of the bark apart from each other, peeling means for progressively, from said cut edges, causing said bark layer to be peeled away from the intermediate layer which underlies it, and deflection means for causing said bark layer to be deflected away from the remainder of said smaller diameter section of stalk and to break off from the remaining bark of said stalk at said annular ring, said stalk cutting means comprises means for receiving said stalk after its smaller diameter section has been debarked in said bark stripping means and for cutting said debarked smaller diameter section from the remainder of said stalk, and said intermediate layer removal means comprises means for receiving said debarked smaller diameter section after it has been cut from said stalk by said stalk cutting means comprising propelling means for propelling said smaller diameter section longitudinally past and sequentially through the following structural elements of said intermediate layer removal means, cutter/spreader means for longitudinally cutting the intermediate layer of said smaller diameter section at the bottom, creating cut edges in said intermediate layer which face each other, and for spreading said cut edges apart from each other while said section is supported by underlying support means, intermediate layer support means for providing support for said section via said intermediate layer as it ravels past, and force means for causing said intermediate layer, progressively from the region of said cut, to separate from the palmheart core which underlies it by pressing downward on the outside of said intermediate layer until said palmheart core disengages from the said intermediate layer.

2. The apparatus described in claim 1 wherein is included at least one of the structures from the group consisting of: underlying support rolls as support means for supporting such a stalk as it traverses said bark stripping means; pusher/conveyor means as means for propelling said stalk, small diameter section first, longitudinally past and through said bark stripping means; knife-edged, flared tail means as part of said cutter/spreader means for longitudinally cutting said bark from said section and spreading the cut edges of the bark apart from each other; a series of roll sets which bear on the interior of said bark layer as peeling means for progressively, from said cut edges, causing said bark layer to be peeled away from the intermediate layer which underlies it; deflector means that is adapted and positioned to interdict said bark layer and, to bear on its inside surface at the side thereof opposite said cut, as means for causing said bark layer to be deflected downward away from the remainder of said stalk and to break off from the remaining bark of said stalk at said annular ring; actuator means for removing selected items of the apparatus comprising said bark stripping means from the path of travel of said tapered and said meristem portions of said stalk before they impinge upon said items of apparatus; pusher/conveyor means as means for propelling said small diameter section longitudinally through said intermediate layer removal means; knife-edged, flared tail means as means for longitudinally cutting and spreading apart at the cut line said intermediate layer of said smaller diameter section; a series of roll sets upon which the interior surfaces of said intermediate layer in the region of said cut edges bear as means for providing support for said section as it travels past; and a series of backing rolls which progressively increasingly along the path of travel of said section bear downward on the top of the outside of said intermediate layer as means for causing said intermediate layer, progressively from the region of said cut, to separate from the palmheart core which underlies it until they separate from each other and said palmheart core disengages from the said intermediate layer and is free to drop by gravity therefrom.

3. For use in processing stalks of palm that include throughout a palmheart core surrounded by an intermediate layer and an outer bark layer, and have a tapered section that is positioned between and is continuous with a larger diameter meristem section and a smaller diameter section which join at an annular ring, bark stripping apparatus for removing the bark from the smaller diameter section of such stalks comprising support means for supporting each stalk of palm that includes throughout a palmheart core surrounded by an intermediate layer and an outer bark layer, and has a tapered section that is positioned between and is continuous with a larger diameter meristem section and a smaller diameter section which join at an annular ring as it traverses said bark stripping means, propelling means for propelling said stalk, smaller diameter section first, longitudinally past and sequentially through the following structural elements of said bark stripping means, cutter/spreader means for longitudinally cutting said bark of said section, creating cut edges in said bark which face each other, and for spreading said cut edges of the bark apart from each other, peeling means for progressively, from said cut edges, causing said bark layer to be peeled away from the intermediate layer which underlies it, and deflection means for causing said bark layer to be deflected away from the remainder of said smaller diameter section of stalk and to break off from the remaining bark of said stalk at said annular ring.

4. The apparatus described in claim 3 wherein is included at least one of the structures from the group consisting of: underlying support rolls as means for supporting such a stalk as it traverses said bark stripping means; pusher/conveyor means as means for propelling said stalk, small diameter section first, longitudinally past and through said bark stripping means; knife-edged, flared tail means as part of said cutter/spreader means for longitudinally cutting said bark from said section and spreading the cut edges of the bark apart from each other; a series of roll sets which bear on the interior of said bark layer as means for progressively, from said cut edges, causing said bark layer to be peeled away from the intermediate layer which underlies it; deflector means that is adapted and positioned to interdict said bark layer and, to bear on its inside surface at the side thereof opposite said cut, as means for causing said bark layer to be deflected downward away from the remainder of said stalk and to break off from the remaining bark of said stalk at said annular ring; and actuator means for removing selected items of the apparatus comprising said bark stripping means from the path of travel of said tapered and said meristem portions of said stalk before they impinge upon said items of apparatus.

5. For use in processing sections of stalks of palm that include a palmheart core surrounded by an intermediate layer and no outer bark layer, apparatus for removing said intermediate layer comprising propelling means for propelling sections of stalks of palm that include a palmheart core surrounded by an intermediate layer and no outer bark layer longitudinally past and sequentially through the following structural elements of said intermediate layer removal means, cutter/spreader means for longitudinally cutting the intermediate layer of each of said smaller diameter section at the bottom, creating cut edges in its intermediate layer which face each other, and for spreading said cut edges apart from each other while said section is supported by underlying support means, intermediate layer support means for providing support for said section via said intermediate layer as it travels past, and force means for causing said intermediate layer, progressively from the region of said cut, to separate from the palmheart core which underlies it by pressing downward on the outside of said intermediate layer until said palmheart core disengages from the said intermediate layer.

6. The apparatus described in claim 5 wherein is included at least one of the structures from the group consisting of: pusher/conveyor means as means for propelling said small diameter section longitudinally through said intermediate layer removal means; knife-edged, flared tail means as means for longitudinally cutting and spreading apart at the cut line said intermediate layer of said smaller diameter section; a series of roll sets upon which the interior surfaces of said intermediate layer in the region of said cut edges bear as means for providing support for said section as it travels past; and a series of backing rolls which progressively increasingly along the path of travel of said section bear downward on the top of the outside of said intermediate layer as means for causing said intermediate layer, progressively from the region of said cut, to separate from the palmheart core which underlies it until they separate from each other and said palmheart core disengages from the said intermediate layer and is free to disassociate therefrom.

* * * * *